(12) United States Patent
Hansch et al.

(10) Patent No.: US 8,069,567 B2
(45) Date of Patent: Dec. 6, 2011

(54) METHOD AND DEVICE FOR THE PRODUCTION OF A SPLIT BEARING ARRANGEMENT

(75) Inventors: Stefan Hansch, Aalen (DE); Juergen Gross, Aalen (DE); Martin Georg Schmid, Herbrechtigen (DE); Eberhard Huegler, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 1169 days.

(21) Appl. No.: 10/593,390

(22) PCT Filed: Feb. 22, 2005

(86) PCT No.: PCT/EP2005/001837
§ 371 (c)(1),
(2), (4) Date: Jul. 20, 2007

(87) PCT Pub. No.: WO2005/095039
PCT Pub. Date: Oct. 13, 2005

(65) Prior Publication Data
US 2008/0028615 A1 Feb. 7, 2008

(30) Foreign Application Priority Data
Mar. 19, 2004 (EP) .................................... 04006698

(51) Int. Cl.
*B23P 17/00* (2006.01)
(52) U.S. Cl. .................... 29/898; 29/898.07; 29/898.13; 29/898.056; 29/898.054

(58) Field of Classification Search .................... 29/898, 29/898.054, 898.056, 898.07, 898.13
See application file for complete search history.

(56) References Cited

U.S. PATENT DOCUMENTS
5,105,538 A * 4/1992 Hoag et al. ................. 29/888.09
(Continued)

FOREIGN PATENT DOCUMENTS
DE      G9417630.2 U     12/1994
(Continued)

OTHER PUBLICATIONS
Search Report mailed Sep. 3, 2004 from corresponding European Application No. 04006698.7.

*Primary Examiner* — Derris Banks
*Assistant Examiner* — Azm Parvez
(74) *Attorney, Agent, or Firm* — Wolf, Greenfield & Sacks, P.C.

(57) ABSTRACT

The invention relates to a method and a device for producing a split bearing arrangement, in which a top bearing part (6) is separated in several machining stations from a basic bearing part (5) that is monolithically joined thereto via a severing breaking process on a predefined plane of breakage (10) by applying a certain force, whereupon the two parts are joined back together by means of a screw connection comprising at least two screws. The basic bearing part (5) and the top bearing part (6) are fixed on an adapter device (1) that is conveyed from one machining station to another while the top bearing part is retained at least during some processes in the machining stations via a retractable auxiliary support (13) which is disposed on the adapter device and catches the top bearing part outside the area of the screw connection.

8 Claims, 4 Drawing Sheets

U.S. PATENT DOCUMENTS

Figure 1:
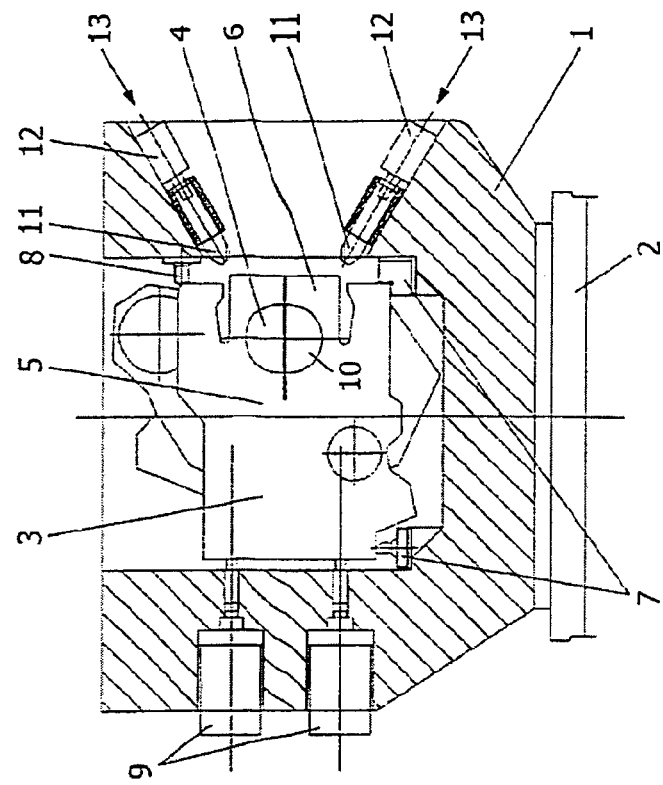

| | | | |
|---|---|---|---|
| 5,115,564 A | 5/1992 | Miessen et al. | |
| 5,169,046 A | 12/1992 | Miessen et al. | |
| 5,208,979 A * | 5/1993 | Schmidt | 29/888.09 |
| 5,263,622 A | 11/1993 | Henzler et al. | |
| 5,974,663 A * | 11/1999 | Ikeda et al. | 29/888.09 |
| 6,671,955 B2 * | 1/2004 | Hugler | 29/888.09 |
| 7,658,003 B2 * | 2/2010 | Hase | 29/888.09 |
| 2002/0162205 A1 | 11/2002 | Hugler | |

FOREIGN PATENT DOCUMENTS

| | | |
|---|---|---|
| DE | 19841027 C1 | 3/2000 |
| EP | 0507519 A2 | 10/1992 |
| EP | 1035936 | 9/2000 |
| JP | 03-014904 | 1/1991 |
| JP | 07-204949 | 8/1995 |
| JP | 2003-512522 | 4/2003 |

* cited by examiner

Incorporating fracture groove

Advancing main support and
carrying out fracturing process

Advancing auxiliary support
Retracting main support

Advancing fixing means

Retracting auxiliary support
Carrying out vibrating and impacting function

Advancing auxiliary support
Retracting fixing means

Positioning screws

Inserting screws

Retracting auxiliary support and screwing device

Tightening screws

Advancing screwing device

METHOD AND DEVICE FOR THE PRODUCTION OF A SPLIT BEARING ARRANGEMENT

The present invention relates to a method for producing a split bearing arrangement, in which in several machining stations a top bearing part is separated in a predefined fracture plane from a base bearing part monolithically connected thereto via a fracture separation process by applying force, whereupon the two parts are joined back together by means of a screw connection comprising at least two screws.

The invention further relates to a device for producing a split bearing arrangement, in which the workpiece consisting of a base bearing part and a top bearing part monolithically connected thereto is conveyed at least to a fracture separation station for separating the top bearing part from the base bearing part and to a screwing station for joining back together the top bearing part and the base bearing part by means of at least a screw connection comprising two screws.

The bearing arrangements of the above type are comprised in, for instance, workpieces such as crankcases, connecting rods or the like.

Given that the path of the fracture will vary during the fracture separation process, it must be ensured that each separated top bearing part (generally referred to as a "cap" in the case of a connecting rod) remains allocated to the corresponding base bearing part (generally referred to as a "rod" in the case of a connecting rod).

In most of the known methods and production devices, this allocation is ensured by inserting the screws of the screw connection prior to the actual fracture separation process and thus joining the respective base bearing part to the corresponding top bearing part so as to exclude a mix-up.

However, even if the screws are not fully screwed in, i.e. if these have a play of several mm with respect to the longitudinal axis of the screws, there is a risk that the screws may at least be abutted, if not even bent, during the fracture separation process, which will cause damage to the screw connection, a reduction in tensile strength and consequently a loss of quality in the connection.

Therefore, methods and production devices have already been implemented, in which the respective top bearing part is separated from the base bearing part after the fracture separation process, removed from the process and returned once the work steps required after the fracture separation process have been completed.

However, due to the process separation, such a procedure presupposes a considerable amount of logistical and technical effort in terms of procedure and device, without allocation errors being completely ruled out thereby.

It is the object of the present invention to provide a method and a production device, in which damage to the screws as well as allocation errors with respect to the top bearing parts are fully excluded.

In terms of the method, said object is solved according to the invention by fixing the base bearing part and the top bearing part on an adapter device that is conveyed from one machining station to another while the top bearing part is retained at least during some processes in the machining stations via a retractable auxiliary support disposed on the adapter device and engaging the top bearing part outside the area of the screw connection.

In terms of the production device, said object is solved according to the invention by providing a transport mechanism via which an adapter device supporting the workpiece is conveyed from one machining station to at least one subsequent machining station, with said adapter device being equipped with a retractable auxiliary support which is fixedly arranged on the adapter device so as to engage the top bearing part of the workpiece outside the screw connection.

The invention is based on the concept of combining the advantages of conventional methods and production devices, in which the screws are placed prior to the fracture separation process, with the advantages of a screwless fracture separation method.

According to the invention, this is achieved by arranging an auxiliary support which is allocated to both bearing parts throughout the entire production sequence, with said auxiliary support ultimately taking over the function of inserted screws in a novel manner and ensuring that the respective top bearing part will remain at the corresponding base bearing part throughout the entire production process. In other words, the auxiliary support is not allocated to a particular station but rather, due to its arrangement on the adapter device, it will remain in the area of both bearing parts, and thus at the workpiece, throughout the entire production process.

In principle, the auxiliary support can have various designs. It may consist of one or several support members engaging the top bearing part at an adequate point that depends on their form. It may be operated mechanically, pneumatically or also hydraulically.

The use of adapter devices for receiving and holding workpieces during production processes with a number of machining stations is already known in the field of production lines. However, the use in a method for producing a split bearing arrangement and the arrangement of an auxiliary support on the adapter device as well as its specific arrangement in conjunction with the advancing and retracting option is completely novel and opens up a number of surprising possibilities for the process flow.

One of said possibilities is provided by the option of advancing and retracting the auxiliary support. Thus, during certain work steps, and in particular during transportation from one machining station to the next, the top bearing part needs to be fixedly retained at the base bearing part. However, it will be necessary during certain work steps and in some machining stations to at least render inoperative or fully retract the auxiliary support, specifically at a stage at which the screw connection has not yet or not yet fully been established or arranged. The advancing and retracting option allows a previously unattained flexibility during various work steps, yet without limiting the advantages of a machining process using an adapter device.

So as to ensure a reliable machining, the base bearing part must be clamped to the adapter device in all the machining stations. This clamping can be implemented by means of internal or external clamping devices. However, a particularly advantageous solution is obtained when the base bearing part is clamped to the adapter device by providing one or more clamping cylinders interacting with corresponding counter-stops on the adapter device.

In principle, the auxiliary support can be designed so as to take over the function of holding the top bearing part at the base bearing part during the fracture separation process. However, it may be expedient in the case of certain materials and workpiece forms to arrange main supports acting from outside in the fracture separation station, which will resiliently act upon the top bearing part during the fracture separation process.

In principle, the workpiece can indeed be fed directly to the screwing station after the fracture separation process. However, it is provided according to the invention that the base bearing part and the top bearing part will undergo a release and cleaning process on the fracture plane after the fracture separation process.

Said release and cleaning process can be implemented in various ways.

It is advantageous for the release process to be carried out by vibrating or impacting action. A vibration or impacting device, which catches the top bearing part and brings it in contact with the base bearing part on the fracture plane in a rapid sequence, can be provided for this purpose in the relevant station. The metal particles generated by the fracture separation process, which are present in loose form on the fracture surface, can thus be removed. This process can be assisted by a blowing, suctioning or brush device.

During the phase of vibrating or impacting action, the top bearing part must be accurately fixed parallel to the fracture plane with respect to the base bearing part, while at the same time being held in a loose manner vertically to the fracture surface. It is expedient in this regard to provide fixing means having fixing and holding pins which can be inserted into the bores for the screws. During this process, the auxiliary supports are retracted for the cleaning process of blowing, suctioning or brushing off so that the top bearing part can be moved away relatively far from the base bearing part to even form a gap, without the connection between these two parts being thereby suspended and thus the above-mentioned allocation errors possibly occurring.

In principle, the fixing and holding pins can be arranged in any manner. However, it is advantageous in the case of a screw connection comprising two screws to link together the two fixing and holding pins required therefor at one end via a yoke and to operate said yoke by means of a feed cylinder to carry out the necessary insertion and retraction movement.

It has proven successful in practice to incorporate what is known as a fracture separation groove in the workpiece prior to the fracture separation process so as to define the fracture separation plane. This groove can be produced in various ways. It is advantageous to incorporate the groove by a laser in the area of the fracture separation plane.

In this regard, it is expedient to incorporate the fracture separation groove by a laser in a separate station arranged immediately before the fracture separation station.

It is advantageous to supply the screws for the screw connection immediately after the release and cleaning process, to insert these into the bores required for this purpose and finally to tighten said screws at a predetermined torque. This process will expediently take place in a separate screwing station arranged downstream of the release and cleaning station.

It may, however, also be expedient to carry out the release and cleaning process after inserting and tightening the screws, rather than before doing so. For this purpose, it will be necessary to loosen the screws again after these have been tightened and to unscrew them to such an extent that the top bearing part can somewhat be lifted away from the base bearing part. The above-described release process by vibrating or impacting action as well as the assistance by blowing, suctioning or brushing off can take place at this stage. Due to the arrangement of the screws, the auxiliary support is thereby in its retracted position. It is understood that the screws will thereafter have to be inserted and tightened again. Depending on the process flow, this may be carried out by return from the release and cleaning station to the screwing station or in an additional screwing station.

In principle, the workpiece can be conveyed from one machining station to another in any form, adapted in each case to the spatial circumstances, the manufacturing as well as the relevant workpiece to be machined. However, a carousel arrangement has proven particularly expedient in this regard, with the individual machining stations being disposed thereabout and the conveyance of the adapter device to and from the individual machining stations being carried out thereby. Thus, a loading and unloading station, a laser station, a fracture separation station, a release and cleaning station, as well as a screwing station can be provided in the region of the carousel arrangement.

A particularly advantageous arrangement will, however, be obtained when the loading and unloading station, the screwing station and the laser station, as well as the fracture separation station and the release and cleaning station are each combined into a twin station in such a production device. Different processes can thus run simultaneously in the different stations, thus minimising down times at the respective stations. A production device so designed is thus capable of machining a larger number of workpieces per time unit without a loss in quality than would be possible if the machining stations were connected in series in a conventional manner and the workpieces to be machined were guided therethrough stepwise.

Essential elements, aspects and process steps of the invention are described and explained in more detail below by referring to the enclosed drawings.

Figure 2:
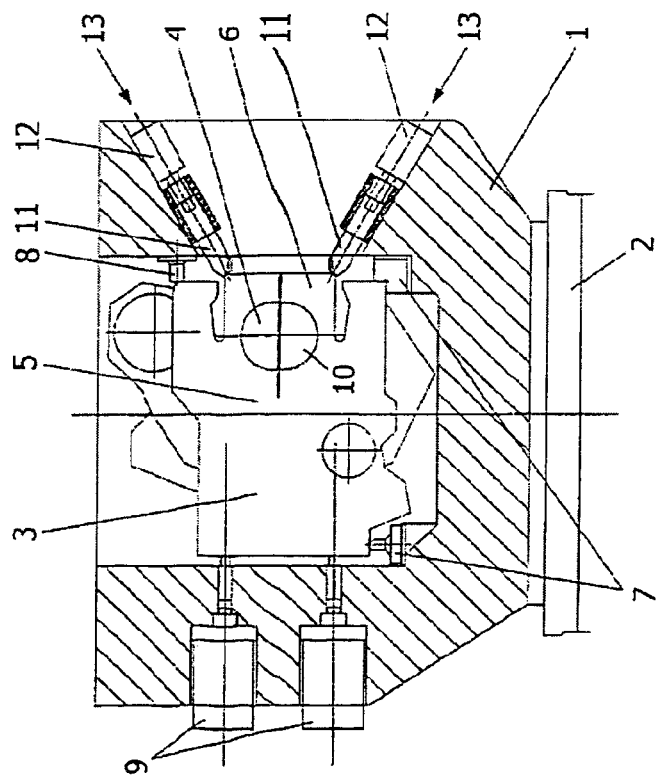
Figure 3A:
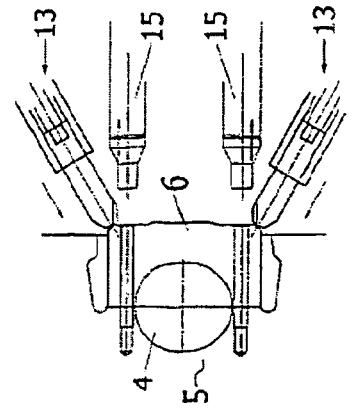
Figure 3B:
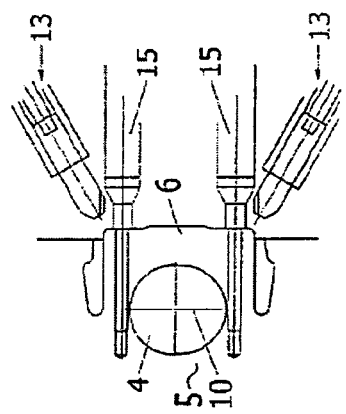
Figure 3C:
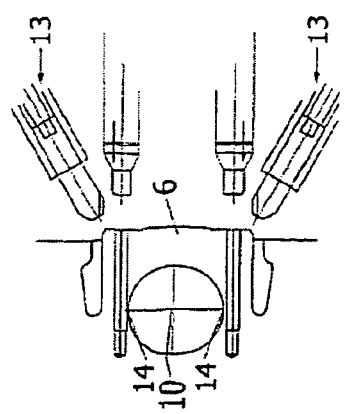
Figure 3D:
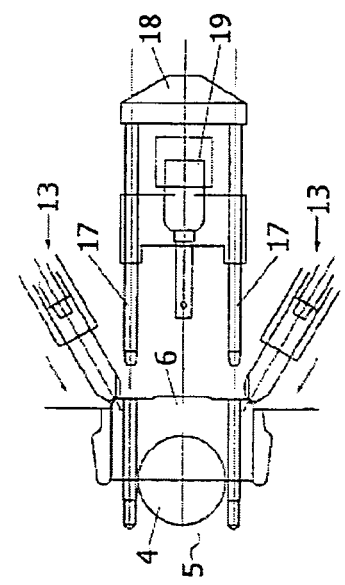
Figure 3E:
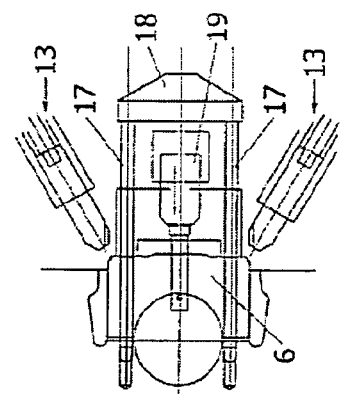
Figure 3F:
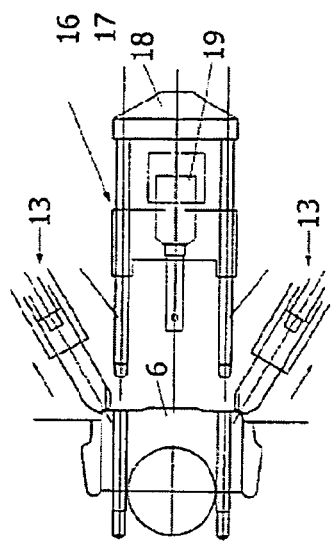
Figure 3G:
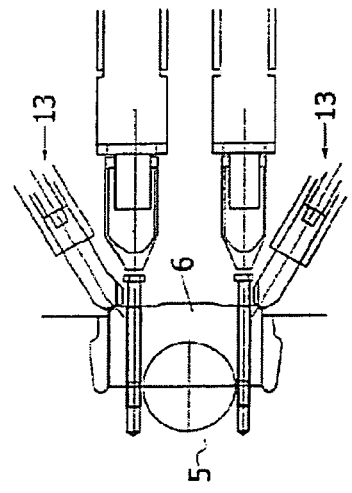
Figure 3H:
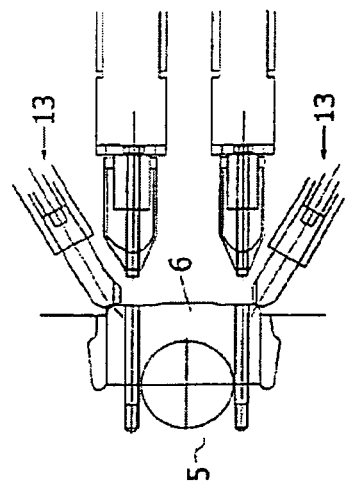
Figure 3L:
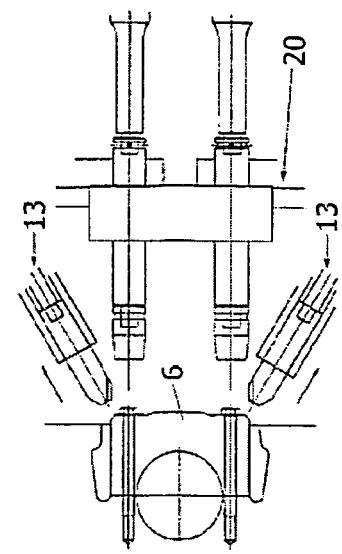
Figure 3K:
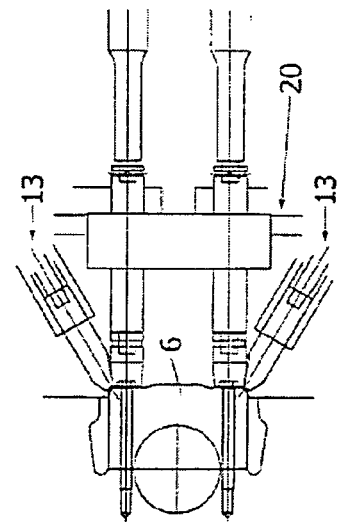
Figure 3I:
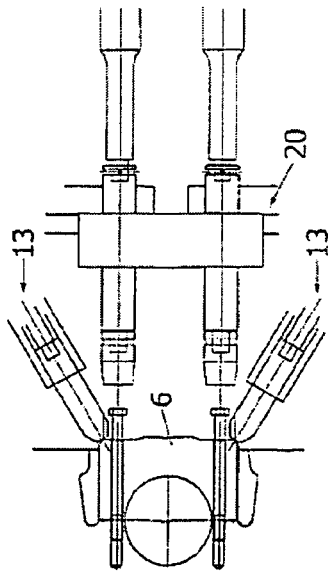
Figure 4:
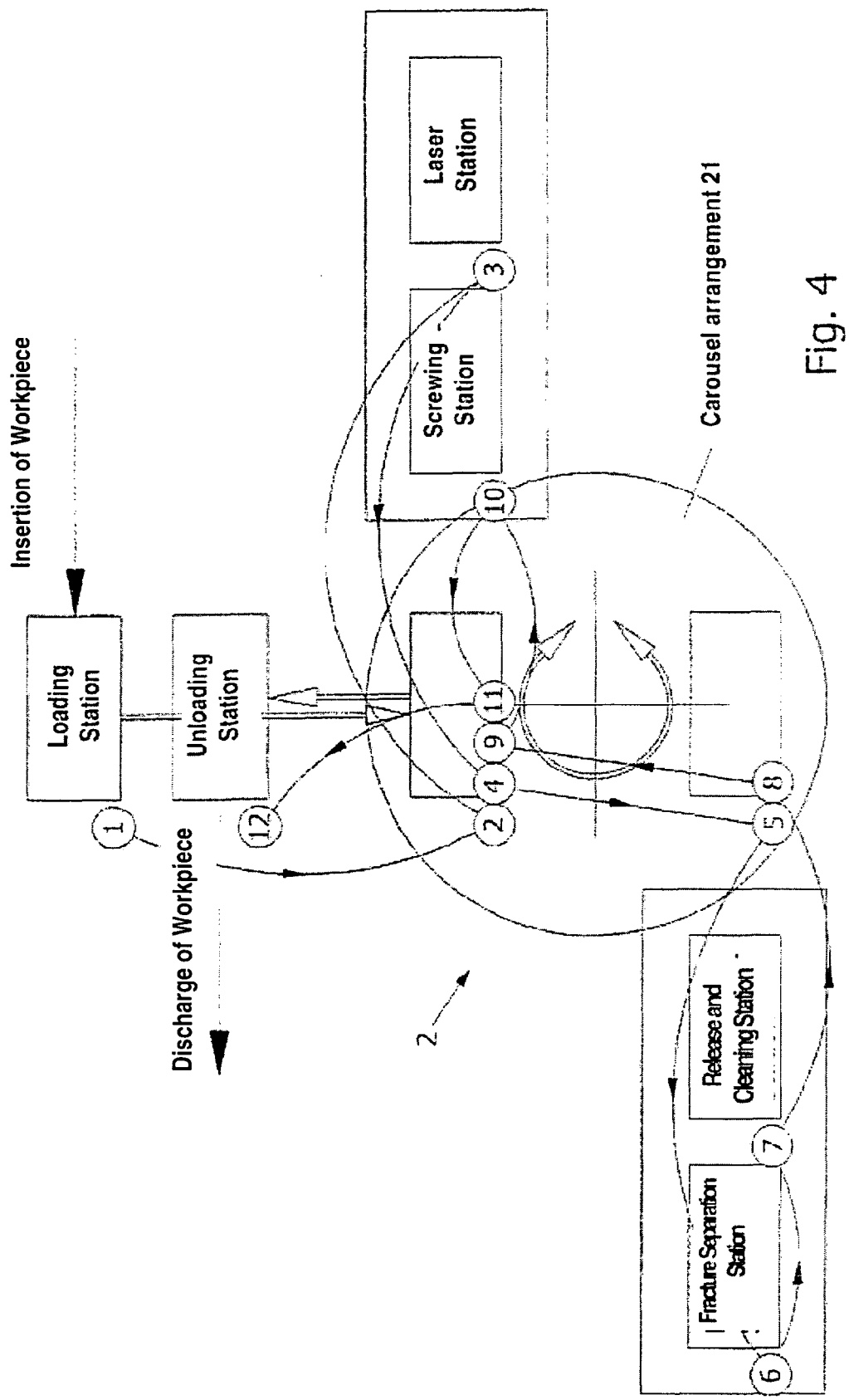

FIG. 1 shows an exemplary embodiment of an adapter device with a workpiece in the form of a crankcase having an auxiliary support which engages a top bearing part of said crankcase, i.e. which is in the advanced position, FIG. 2 shows the arrangement as according to FIG. 1 with the auxiliary support retracted from the top bearing part of the crankcase, FIGS. 3*a*-3*i* and 3*k*-3*l* show a schematic representation of the top bearing part of the crankcase as according to FIGS. 1 and 2 with the auxiliary support at different machining stages and in different machining stations of the inventive production device, and FIG. 4 shows a schematic machine layout of an inventive production device equipped with a carousel arrangement for carrying out the inventive method.

The exemplary embodiment of an adapter device 1 as shown in a vertical cross-section in FIGS. 1 and 2 rests on a transport mechanism 2 and is essentially trough-shaped, i.e. it has a U-shaped cross-section.

The workpiece in the form of a crankcase 3 rests in the interior of the trough-shaped adapter device 1 and is provided (when seen in the drawing plane) with a number of bearing arrangements 4 arranged in series, each consisting of a base bearing part 5 as well as a top bearing part 6.

The bottom of the crankcase 3 rests on counterstops 7 and the side of the crankcase facing the bearing arrangement 4 abuts against a counterstop 8.

On the side opposite the bearing arrangement 4, the adapter device is equipped with two clamping cylinders 9 via which the crankcase 3 can be pressed onto the counterstops 7 and 8 and can thus be clamped to the adapter device.

So as to divide the bearing arrangement 4, the top bearing part 6 must be separated from the bearing part 5 that is monolithically connected thereto along a fracture plane 10. This takes place via a fracture separation process, known per se, in what is known as a fracture separation station, in which a breaking force is applied to the bores of the bearing arrangement 4 in a known manner via a fracturing mandrel that is typically split in two parts.

As may be taken from FIGS. 1 and 2, support plungers 11 are disposed at an acute angle to each other on that side of the adapter device 1 opposite the clamping cylinders 9, with said support plungers being arranged at the front end of support cylinders 12 which together form the auxiliary support 13 for the top bearing part 6. As already mentioned, FIG. 1 shows the auxiliary support 13 in a position engaging the top bearing part, i.e. in its advanced position, whereas FIG. 2 shows the support plungers 11 of the auxiliary support 13 in a retracted position, i.e. lifted away from the top bearing part 6.

In the exemplary embodiment shown in the Figures, the top bearing part 6 is retained at the base bearing part 5 by a screw connection comprising two screws once the fracture separation process has been carried out.

Mounting holes for screws as well as the necessary threads are incorporated for this purpose in a known manner into the top bearing part 6 and the base bearing part 5 in a drilling station (not shown) prior to the fracture separation process. The crankcase thus prepared is then conveyed by the transport mechanism 2 via the adapter device 1 to the first station of the production device, in which fracture grooves 14 are incorporated in the fracture plane. This technology is known and can be carried out in various ways, preferably however by removing material using a laser.

A schematic representation of this procedure is shown in FIG. 3a. The auxiliary support 13 is retraced at this stage.

After incorporating the fracture grooves 14, the crankcase 3 is conveyed to the fracture separation station via the transport mechanism 2 in the adapter device. Given that the top bearing part 6 is still monolithically connected to the base bearing part at this stage, the auxiliary support 13 is still in its retracted condition, as may be taken from FIG. 3b.

In the exemplary embodiment shown, main supports 15 are advanced prior to the subsequent fracture separation process, with said main supports resiliently engaging the top bearing part 6 in a known manner and preventing what is known as a torsional fracture during the fracture separation process.

After completion of the fracture separation process, the auxiliary support 13 is first advanced and the main support 15 is thereupon retracted, as shown schematically in FIG. 3c. In doing so, the auxiliary support 13 ensures that the top bearing part 6, which has already been separated from the base bearing part 5 at this stage, cannot be released from the base bearing part 5 and thus be mixed up with another top bearing part.

After retraction of the main support 15, a fixing means 16 is advanced, as shown schematically in FIG. 3d. In the present exemplary embodiment, said fixing means 16 comprises two fixing and holding pins 17, which are linked together via a yoke 18.

Further, a vibration or impacting device 19 is arranged in the area of said fixing means.

As can be seen from FIG. 3e, the fixing and holding pins 17 are inserted into the bores for the screws in a further work step and thus the top bearing part 6 is accurately fixed in position in parallel to the fracture plane 10 with respect to the base bearing part 5, while at the same time being held in a loose manner perpendicularly to the fracture plane. The auxiliary support 13 is retracted at this stage and the vibration or impacting device 19 is advanced and brought into abutment against the top bearing part 6, as shown schematically in FIG. 3e. The vibrating or impacting function is performed thereupon and thus metal particles possibly adhering to the fracture plane are released.

Given that the top bearing part 6 is held loosely by the fixing and holding pins 17, the top bearing part can, if necessary, even be pulled away from the base bearing part 5 to a limited extent and the fracture surface can be additionally cleaned by blowing, suctioning or brushing off.

In a subsequent step, the auxiliary support 13 is advanced again and thus the top bearing part 6 is fixed accurately with respect to the base bearing part 5. The vibration or impacting device 19 can be decoupled and the fixing means 16 retracted at this stage.

In a subsequent work step, the screws are positioned and inserted into the bores, as shown schematically in FIGS. 3g and 3h. After supplying the screws, a screwing device is provided in a subsequent work step. The screws are thereupon tightened at a predetermined torque, as shown schematically in FIG. 3k.

During the described stages (FIGS. 3f-3i and 3k), the top bearing part 6 is retained with precision at the base bearing part 5 at all times and thus not only the mix-ups described above are excluded but also it is ensured that the top bearing part 6 is securely retained at the base bearing part 5 in a position corresponding exactly to the position prior to the fracture separation process, i.e. such that the elevations and depressions of the fracture surface of one part correspond exactly to the depressions and elevations of the fracture surface of the other part. According to the invention, this situation is moreover ensured throughout the entire course of the production given that the top bearing part is retained at the base bearing part in precise allocation and position either by the auxiliary support 13 or (as shown in FIG. 3e) by the fixing and holding pins 17.

It is a further advantage of the procedure as according to the invention that the screws are only inserted and tightened after completion of the fracture separation process and thus a high-quality screw connection is ensured at all times. Damage to the screws or even a bending of the screws during the fracture separation process is thus excluded.

After tightening the screws at a predetermined torque, the auxiliary support is retracted and the crankcase thus machined is conveyed to a further process step via the adapter device 1 and the transport mechanism 2.

In the production device as shown schematically in FIG. 4, a so-called carousel arrangement 21 was selected as the central transport mechanism 2, with the different stations being disposed at the periphery thereof.

It is a further characteristic of this particular arrangement that two stations each are combined into a twin station.

The transportation from one station to the subsequent station is marked by arrows in FIG. 4. The sequence is revealed by the position numbers given in each circle, which designate the workflow in the carousel arrangement along with the different stations.

In more detail, the workflow in the production device as suggested in FIG. 4 is as follows:

In position 1, the workpiece is placed in the adapter device, aligned and clamped by means of the clamping cylinders. The auxiliary supports are in the retracted position at this stage (cf. FIG. 2).

From position 1, i.e. the loading station, the adapter device is conveyed to the carousel arrangement (position 2) together with the clamped workpiece and from there to the laser station (position 3).

Once the fracture separation groove has been incorporated in the laser station, the adapter device is fed back to the carousel arrangement in position 4 together with the workpiece and moved to position 5 via a rotation of the carousel arrangement, wherefrom it is subsequently conveyed to the fracture separation station (position 6) and, after the fracture separation, to the release and cleaning station (position 7).

The adapter device together with the fracture-separated and cleaned workpiece are then returned to the carousel arrangement (position 8) and will reach position 9 via a rotation of the carousel arrangement, wherefrom the adapter device together with the workpiece are subsequently fed to the screwing station (position 10), in which the screws are turned in and tightened at a predetermined torque.

After this process, the adapter device is conveyed to the unloading station (position 12) via position 11 on the carousel arrangement. The finished workpiece is removed from the adapter device and discharged at this stage.

The use of a carousel arrangement 21 as a central transport mechanism and the configuration of the loading and unloading station on the one hand, the screwing station and the laser station on the other hand, as well as the fracture separation station and the release and cleaning station into a double station each has the advantage that the work steps depicted in the following can run simultaneously, i.e. there is no need to wait until the previous, fully machined workpiece has been unloaded before a new workpiece can be loaded.

The sequence can thus be selected on the basis of the carousel arrangement 21 such that in the time span during which one workpiece is provided with a fracture separation groove in the laser station, a previous workpiece, which has already been provided with a fracture separation groove, can at the same time undergo a fracture separation process in the fracture separation station and any possible metal particles can be removed therefrom in the release and cleaning station. Downtimes can thus be reduced in the individual stations and the number of pieces machined per time unit increased.

The invention claimed is:

1. A method for producing a split bearing arrangement, in which in several machining stations a top bearing part is separated in a predefined fracture plane from a base bearing part monolithically connected thereto via a fracture separation process by applying force, comprising:
the base bearing part and the top bearing part are fixed on an adapter device that is conveyed from one machining station to another while the top bearing part is retained at least during some processes in the machining stations via a retractable auxiliary support disposed on the adapter device and engaging the top bearing part,
the base bearing part and the top bearing part are subjected to a release and cleaning process in the fracture plane after the fracture separation process, and
the location of the top bearing part is fixed, by a fixing means including holding pins, in position in parallel to the fracture plane with respect to the base bearing part during the release and cleaning process, whilst the top bearing part is held by the fixing means in a loose manner in a direction perpendicular to the fracture plane, whereupon the base bearing part and the top bearing part are finally joined back together following the release and cleaning process by a screw connection comprising at least two screws.

2. The method as according to claim 1, wherein the base bearing part is clamped to the adapter device in all the machining stations.

3. The method as according to claim 1, wherein there are main supports acting resiliently upon the top bearing part during the fracture separation process.

4. The method as according to claim 1, wherein the release process is carried out by vibrating or impacting action.

5. The method as according to claim 1, wherein the cleaning process is carried out by blowing, suctioning or brushing off.

6. The method as according to claim 1, wherein a fracture separation groove is incorporated in the fracture plane by a laser prior to the fracture separation process.

7. The method as according to claim 1, wherein the screws are inserted and tightened at a predetermined torque after the release and cleaning process.

8. The method as according to claim 1, wherein the conveyance of the adapter device to and from the individual machining stations is carried out via a carousel arrangement.

* * * * *